US012678812B2

(12) United States Patent
Shazuki

(10) Patent No.: US 12,678,812 B2
(45) Date of Patent: Jul. 14, 2026

(54) TRIGGER SPRAYER

(71) Applicant: CANYON CORPORATION, Tokyo (JP)

(72) Inventor: Mitsuaki Shazuki, Sanyo Onoda (JP)

(73) Assignee: CANYON CORPORATION, Tokyo (JP)

( * ) Notice: Subject to any disclaimer, the term of this patent is extended or adjusted under 35 U.S.C. 154(b) by 295 days.

(21) Appl. No.: 18/259,396

(22) PCT Filed: Dec. 22, 2021

(86) PCT No.: PCT/JP2021/047552

§ 371 (c)(1),
(2) Date: Jun. 27, 2023

(87) PCT Pub. No.: WO2022/145305

PCT Pub. Date: Jul. 7, 2022

(65) Prior Publication Data

US 2024/0066538 A1 Feb. 29, 2024

(30) Foreign Application Priority Data

Dec. 29, 2020 (JP) ................................ 2020-219863

(51) Int. Cl.
*B05B 11/00* (2023.01)
*B05B 11/10* (2023.01)

(52) U.S. Cl.
CPC ........ *B05B 11/007* (2013.01); *B05B 11/0008* (2013.01); *B05B 11/1011* (2023.01); *B05B 11/104* (2023.01)

(58) Field of Classification Search
CPC ... B05B 11/007; B05B 11/104; B05B 11/1011
(Continued)

(56) References Cited

U.S. PATENT DOCUMENTS 5,622,317 A * 4/1997 Foster ................. B05B 11/1011 239/333
5,711,461 A * 1/1998 Foster ................. B05B 11/0044 222/383.1

(Continued)

FOREIGN PATENT DOCUMENTS

CN 111924318 A 11/2020
EP 0798050 A1 10/1997
WO 2013/079418 A1 6/2013

OTHER PUBLICATIONS

The extended European search report of the corresponding EP application No. 21915165.1 mailed Oct. 16, 2024.

*Primary Examiner* — Chee-Chong Lee
(74) *Attorney, Agent, or Firm* — Muncy, Geissler, Olds & Lowe, P.C.

(57) ABSTRACT

[Object] To provide a trigger sprayer excellent in ejection responsiveness and ejection stability.
[Solution] The present invention is directed to a trigger sprayer 100 having a base body 10 having a main cylinder portion 2 and a sub-cylinder portion 3 which can store liquid, a piston portion 20 slidable along an inner wall of the main cylinder portion 2, a trigger 30 for sliding the piston portion 20, a first valve V1 which opens and closes in accordance with pressure inside the main cylinder portion 2, and a second valve V2 which opens and closes in accordance with pressure of the liquid, the second valve V2 having a second valve piston portion 11*a* slidable along an inner wall 3*a* of the sub-cylinder portion 3 and an inverted-dome-shaped dome spring portion 11*b* for pressing the second valve piston portion 11*a*, and the dome spring portion 11*b* being elastically deformable.

4 Claims, 8 Drawing Sheets

(58) Field of Classification Search
USPC .......................................................... 239/526
See application file for complete search history.

(56) References Cited

U.S. PATENT DOCUMENTS

| | | | | |
|---|---|---|---|---|
| 6,116,472 | A * | 9/2000 | Wanbaugh | B05B 11/1064 222/340 |
| 6,131,820 | A * | 10/2000 | Dodd | B05B 11/1011 239/492 |
| 7,497,358 | B2 * | 3/2009 | Clynes | B05B 11/1011 222/340 |
| 10,040,087 | B2 * | 8/2018 | Fujiwara | B05B 11/1011 |
| 10,512,925 | B2 * | 12/2019 | Nakano | B05B 15/20 |
| 2006/0054642 | A1 * | 3/2006 | Buti | B05B 11/1074 222/383.1 |
| 2006/0289679 | A1 * | 12/2006 | Johnson | B05B 1/3046 222/333 |
| 2014/0319244 | A1 | 10/2014 | Rech | |
| 2019/0217317 | A1 | 7/2019 | Shazuki | |

* cited by examiner

TRIGGER SPRAYER

TECHNICAL FIELD

The present invention relates to trigger sprayers and, in more detail, to a trigger spray causing liquid to be ejected or causing ejection of liquid to be stopped by operation of a trigger.

BACKGROUND ART

A so-called accumulator trigger sprayer that suctions up liquid accommodated in a container with operation of the trigger, stores a certain amount of the liquid, and continuously ejects it has been known.

This trigger sprayer generally has a valve (hereinafter also referred to as a "first valve") for preventing backflow of the stored liquid into the container and a valve (hereinafter also referred to as a "second valve") for preventing backflow of the remaining liquid after ejection.

As a specific example, for example, a sprayer configured of a body having a flexible container including spray liquid, a cylinder inside this body, a movable piston in the cylinder, and a rotatable trigger-type operation lever provided inside this body has been known (for example, refer to PTL 1).

In this sprayer, a valve piston (second valve) is configured to move upward and downward by a coil-shaped spring.

Also, a sprayer having a main body including a nozzle attached to a mouth of a container to atomize liquid and having a pump chamber formed therein, a trigger lever attached to the main body and a stem of a plunger to slide as hermetically sealing the inside of the pump chamber, and a one-directional valve which controls suction of the liquid from the container with activation of the trigger lever has been known (for example, refer to PTL 2). In this sprayer, a piston (second valve) of a first section is retained so as to become in a closed state by a plate-spring-shaped spring.

CITATION LIST

Patent Literature

PTL 1: European Patent Application Laid-Open No. 0798050

PTL 2: International Publication No. 2013/079418 pamphlet

SUMMARY OF INVENTION

Technical Problem

Meanwhile, in the trigger sprayer, an improvement in ejection of liquid with good responsiveness with respect to operation of the trigger (hereinafter referred to as "ejection responsiveness") and continuous ejection of a certain amount without unevenness (hereinafter referred to as "ejection stability") has been conventionally a large problem.

To address this, second valves of various types have been developed, such as a coil-shaped spring described in the above-mentioned PTL 1 and a plate-spring-shaped spring described in the above-mentioned PTL 2, but those sufficiently satisfying ejection responsiveness and ejection stability have not been obtained.

The present invention was made in view of the above-described circumstances, and has an object of providing a trigger sprayer excellent in ejection responsiveness and ejection stability.

Solution to Problems

As a result of diligent studies to solve the above-described problem, the inventor has found that the above-described problem can be solved by adopting, as a second valve, one having a second valve piston portion and an elastically-deformable dome spring portion having a reverse-dome shape, and has completed the present invention.

The present invention resides in (1) a trigger sprayer for suctioning up liquid in a container for ejection, the trigger sprayer including: a base body having a first flow path where the liquid flows, a main cylinder portion communicated with the first flow path to be able to store the liquid, a second flow path communicated with the main cylinder portion, a sub-cylinder portion communicated with the second flow path, a third flow path communicated with the sub-cylinder portion, and a nozzle portion provided at a tip of the third flow path; a piston portion slidable along an inner wall of the main cylinder portion; a trigger coupled to the piston portion to slide the piston portion; a first valve which opens and closes between the first flow path and the main cylinder portion and between the main cylinder portion and the second flow path in accordance with pressure inside the main cylinder portion; and a second valve which opens and closes between the second flow path and the sub-cylinder portion and between the sub-cylinder portion and the third flow path in accordance with pressure of the flowing liquid, the second valve having a second valve piston portion slidable along an inner wall of the sub-cylinder portion, and an inverted-dome-shaped dome spring portion for pressing the second valve piston portion, and the dome spring portion being elastically deformable.

The present invention resides in the trigger sprayer described in the above (1), in which (2) the second valve is arranged above the main cylinder portion.

The present invention resides in the trigger sprayer described in the above (1) or (2), in which (3) a diameter of the dome spring portion is larger than a diameter of the second valve piston portion.

The present invention resides in the trigger sprayer described in any one of the above (1) to (3), in which (4) the second valve piston portion has an outer skirt portion abutting on the inner wall of the sub-cylinder portion and an inner skirt portion abutting on the inner wall of the sub-cylinder portion at a portion lower than the outer skirt portion, a diameter of the outer skirt portion and a diameter of the inner skirt portion are equal, and with the second valve piston portion sliding, a gap occurs between the inner wall of the sub-cylinder portion and the inner skirt portion, and the liquid flows via the gap from the second flow path to the third flow path.

The present invention resides in the trigger sprayer described in any one of the above (1) to (4), further including (5) a cover body attached to the base body so as to cover at least the second flow path, the sub-cylinder portion, and the third flow path, wherein the cover body is provided with a support wall surface where the dome spring portion abuts.

The present invention resides in the trigger sprayer described in any one of the above (1) to (5), in which (6) a long groove portion is provided in the inner wall of the sub-cylinder portion, and when the second valve is opened, the liquid flows from the second flow path via the long groove portion to the third flow path.

The present invention resides in the trigger sprayer described in the above (6), in which (7) the long groove portion has a vertically elongated shape, and a plurality of said long grooves are provided so as to be regularly spaced in a circumferential direction.

Advantageous Effects of Invention

In the trigger sprayer of the present invention, since the dome spring portion of the second valve is elastically deformable, with expansion and contraction of the dome spring portion, the second valve piston portion moves upward and downward.

Here, since the dome spring portion is in an inverted dome shape, at the time of expansion or contraction, a uniform force acts to a circumferential direction of the dome spring portion.

With this, in the trigger sprayer, the second valve piston portion can be uniformly moved upward and downward.

As a result, unevenness in the flow rate of the liquid hardly occurs, and ejection stability is improved.

Also, since the second valve piston portion can smoothly move upward and downward, ejection responsiveness is also excellent.

In the trigger sprayer of the present invention, the second valve is preferably arranged above the main cylinder portion.

In this case, since the second valve is not obstructive, the length of the main cylinder portion in a lateral direction can be lengthened as much as possible.

With that, since the diameter of the main cylinder portion can be decreased, a force required to pull the trigger can be weakened.

As a result, the trigger can be pulled even by weak children or elderly people.

In the trigger sprayer of the present invention, the diameter of the dome spring portion is preferably larger than the diameter of the second valve piston.

In this case, since upward and downward movements of the second valve piston portion are stabilized and become smoother, ejection responsiveness becomes more excellent.

Also, a space in the up-down direction required for expansion and contraction of the second valve can be made as small as possible.

In the trigger sprayer of the present invention, since the second valve piston portion has the outer skirt portion and the inner skirt portion abutting on the inner wall of the sub-cylinder portion, the inside of the sub-cylinder portion is in a state of being doubly sealed by the second valve piston portion.

And, when the second valve piston portion slides upward along the inner wall of the sub-cylinder portion, while the state of being sealed by the outer skirt portion is maintained, the liquid flows through a gap occurring between the inner wall of the sub-cylinder portion and the inner skirt portion, thereby allowing the liquid to quickly flow.

Also, since the diameter of the outer skirt portion and the diameter of the inner skirt portion are equal, even if the second valve piston portion moves upward and downward, the capacity of an air gap portion surrounded by the outer skirt portion, the inner skirt portion, and the sub-cylinder portion is unchanged.

With this, it is possible to prevent an occurrence of liquid drippings from the nozzle portion after ejection of the liquid.

In the trigger sprayer of the present invention, with the cover body provided, the base body can be prevented from being soiled.

Also, by providing the cover body with the support wall surface where the dome spring portion abuts, it is not required to separately provide the support wall surface. Thus, the structure of the trigger sprayer can be made simple and compact.

In the trigger sprayer of the present invention, with the long groove portion provided in the inner wall of the sub-cylinder portion, a sufficient amount of liquid can be caused to flow.

That is, the liquid can be caused to flow not only from the second flow path via the inside of the sub-cylinder portion to the third flow path but also from the second flow path via the long groove portion to the third flow path.

Note that this long groove portion is vertically elongated and a plurality of long groove portions are preferably provided so as to be regularly spaced in a circumferential direction.

BRIEF DESCRIPTION OF DRAWINGS

FIG. 5(*b*) is a side sectional view depicting a state in which, from the state depicted in FIG. 5(*a*), the trigger is completed to be rotated rearward and ejection of liquid is completed.

FIG. 5(*c*) is a side sectional view depicting a state, from the state depicted in FIG. 5(*b*), in the course of rotating the trigger forward.

DESCRIPTION OF EMBODIMENTS

Figure 1:
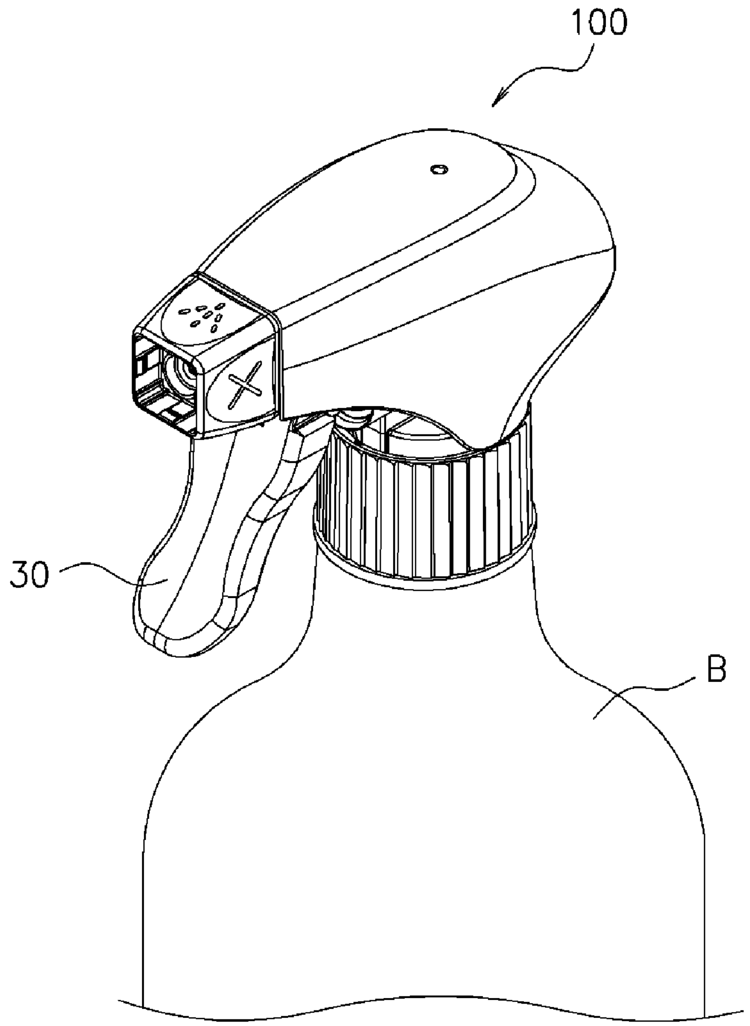
FIG. 1 is a perspective view depicting a state in which a trigger sprayer according to the present embodiment is attached to a container.

In the following, with reference to the drawings as required, a preferred embodiment of the present invention is described in detail. Note in the drawings that the same components are provided with the same reference numeral and redundant description is omitted. Also, relations in position such as above, below, left, and right are assumed to be based on the position relation depicted in the drawings unless otherwise specified. Furthermore, the dimensional ratios of the drawings are not limited to the ratios depicted in the drawings.

FIG. 1 is a perspective view depicting a state in which a trigger sprayer according to the present embodiment is attached to a container.

As depicted in FIG. 1, a trigger sprayer 100 is used by being attached to a container B having liquid stored therein. Then, by operating a trigger 30, a predetermined amount of liquid can be ejected to a predetermined direction.

Note that the shape and material of the container B are not particularly limited, and any known one can be adopted as appropriate.

Also, the liquid is not particularly limited as long as it can be ejected, and any known one can be adopted as appropriate.

Figure 2:
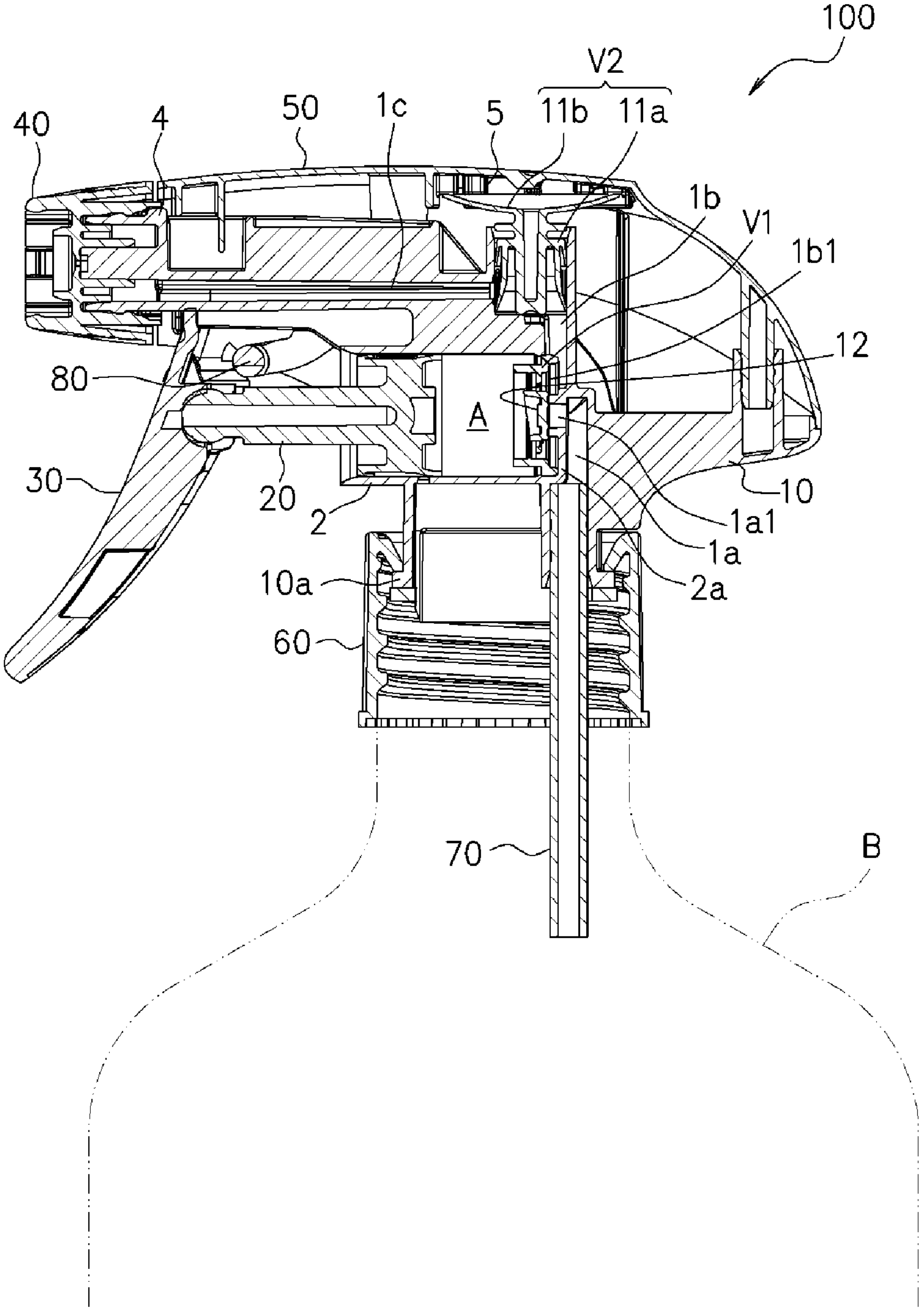
FIG. 2 is a side sectional view depicting the trigger sprayer according to the present embodiment.

FIG. 2 is a side sectional view depicting the trigger sprayer according to the present embodiment.

As depicted in FIG. 2, the trigger sprayer 100 has a base body 10, a piston portion 20 attached to a main cylinder portion 2 of the base body 10, a trigger 30 coupled to the piston portion 20 and pivotally attached to the base body 10, a first valve V1 and a second valve V2 incorporated in the base body 10 to control a flow of the liquid, a cover body 50 for covering the base body 10, a nozzle cap 40 attached to a nozzle portion 4 of the base body 10, a cap 60 for attaching the base body 10 to the container, and a tube 70 attached so as to communicate with a first flow path 1*a* of the base body 10.

That is, the trigger sprayer 100 is formed of the base body 10, the piston portion 20 attached to the base body 10, the trigger 30, the first valve V1, the second valve V2, the cover body 50, the nozzle cap 40, the cap 60, and the tube 70.

In the trigger sprayer 100, with the trigger 30 rotated, the liquid in the container B is suctioned up via the tube 70 to the base body 10, flows inside the base body 10, and is ejected from the nozzle portion 4 of the base body 10 via the nozzle cap 40.

Note that details of a flow route of the liquid in the base body 10 are described further below.

The base body 10 is in an inverted L shape in side view. Note in the specification that a nozzle portion 4 side of the trigger sprayer 100 is taken as "front" and its opposite side is taken as "rear.

In the base body 10, in a portion extending to an up-down direction, a first flow path 1*a* where the liquid flows, a main cylinder portion 2 communicated with the first flow path 1*a* to be able to store the liquid and a second flow path 1*b* communicated with the main cylinder portion 2 are provided. In a portion extending to a front-rear direction, a sub-cylinder portion 3 communicated with the second flow path 1*b*, a third flow path 1*c* communicated with the sub-cylinder portion 3, and the nozzle portion 4 provided at a tip of the third flow path 1*c* are provided.

In the base body 10, its lower end has the tube 70 attached thereto.

The first flow path 1*a* extends to the up-down direction, and its lower end portion is in contact with the tube 70 so that their inner portions communicate with each other.

Also, the first flow path 1*a* is provided with a first flow hole 1*a*1 on a side wall near its upper end portion. Via the first flow hole 1*a*1, the inner portion of the first flow path 1*a* and the inner portion of the main cylinder portion 2 (hereinafter also referred to "inner cylinder space A") communicate with each other.

The second flow path 1*b* extends to the up-down direction, and has its upper end portion coupled to the sub-cylinder portion 3 so that their inner portions communicate with each other.

Also, the second flow path 1*b* is provided with a second flow hole 1*b*1 on a side wall near its lower end portion. Via the second flow hole 1*b*1, the inside of the second flow path 1*b* and the inner cylinder space A communicate with each other.

Note that the side wall provided with the first flow hole 1*a*1 and the side wall provided with the second flow hole 1*b*1 correspond to a bottom wall 2*a* of the main cylinder portion 2 (right-side wall of the main cylinder portion 2 in FIG. 2).

Therefore, in the trigger sprayer 100, the first flow path 1*a* and the second flow path 1*b* extend to the up-down direction. Via the main cylinder portion 2, their inner portions communicate with each other.

The main cylinder portion 2 is in a laterally-oriented cylindrical shape.

Also, the first valve V1 is attached in the main cylinder portion 2, so as to be in contact with its bottom wall 2*a*.

The first valve V1 is a so-called check valve, and has a valve body 12 that opens and closes a connecting portion between the inner cylinder space A and the first flow hole 1*a*1.

Note that the circumference of the first flow hole 1*a*1 of the bottom wall 2*a* to which the first valve V1 is attached has a role of a valve seat with respect to the valve body 12.

In the trigger sprayer 100, the piston portion 20 is attached to the main cylinder portion 2.

That is, the inner cylinder space A is in a state of being hermetically sealed by the piston portion 20.

Also, the piston portion 20 has its one end pivotally attached to a bulging portion of the arc-shaped trigger 30, and the trigger 30 has its upper end pivotally attached to a lower side of the third flow path 1*c* of the base body 10.

When the trigger 30 is rotated as being pulled rearward with respect to the base body 10, the piston portion 20 is in conjunction with it to slide to a length direction (front-and-rear direction) of the main cylinder portion 2 along the inner wall of the main cylinder portion 2.

This allows the pressure of the inner cylinder space A to fluctuate.

Note that when the trigger 30 is released from a state of being pulled rearward, the trigger 30 is rotated so as to be returned to the original position by a spring 80 attached to the trigger 30.

The third flow path 1*c* extends to the front-rear direction, and has its rear end portion coupled to the sub-cylinder portion 3 so that their inner portions communicate with each other.

Also, the third flow path 1*c* has its front end portion coupled to the nozzle portion 4 so that their inner portions communicate with each other.

The sub-cylinder portion 3 is in a vertically-oriented cylindrical shape.

Figure 3:
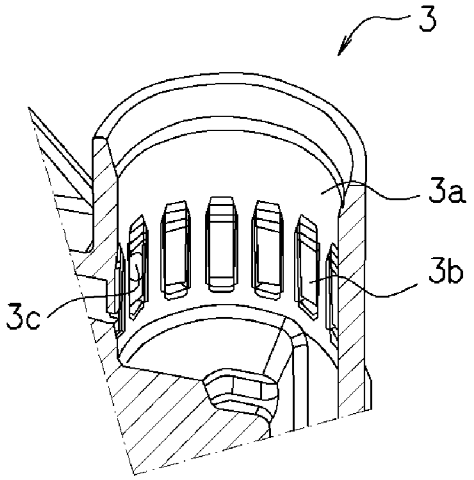
FIG. 3 is a perspective view depicting the inside of the trigger sprayer according to the present embodiment when its sub-cylinder portion is cut out in a vertical direction.

FIG. 3 is a perspective view depicting the inside of the trigger sprayer according to the present embodiment when its sub-cylinder portion is cut out in a vertical direction.

As depicted in FIG. 3, the sub-cylinder portion 3 has its inner wall 3*a* provided with long groove portions 3*b* each recessed in a vertically elongated shape.

The plurality of these long groove portions 3*b* are equidistantly provided in a circumferential direction of the inner wall 3*a* of the sub-cylinder portion 3.

In the trigger sprayer 100, with the long groove portions 3*b* provided in the inner wall 3*a* of the sub-cylinder portion 3, the inner capacity is large.

Also, since the plurality of long groove portions 3*b* are equidistantly provided, the second valve V2 can abut on the inner wall 3*a* of the sub-cylinder portion 3 between the long groove portions 3*b*, but the second valve V2 cannot abut on bottom portions of the long groove portions 3*b*.

Also, a through hole 3*c* is provided at a position of each long groove portion 3*b* corresponding to the third flow path 1*c*. With this, the liquid flowing through the long groove portion 3*b* flows via the through hole 3*c* through the third flow path 1*c*.

Referring back to FIG. 2, the sub-cylinder portion 3 has the second valve V2 arranged inside.

Here, in the trigger sprayer 100, the second valve V2 is arranged above the main cylinder portion 2.

That is, the sub-cylinder portion 3 is formed above the main cylinder portion 2.

Since this allows the length of the main cylinder portion 2 in the lateral direction to be lengthened, the diameter of the main cylinder portion 2 can be decreased while the capacity is unchanged.

As a result, a force required to pull the trigger can be weakened.

Figure 4:
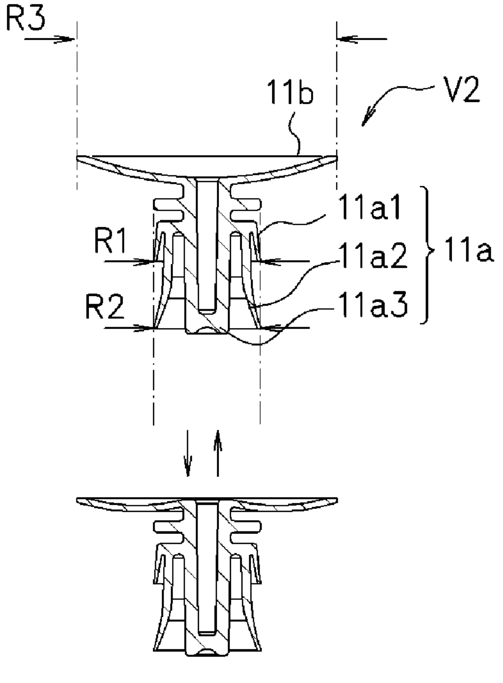
FIG. 4 is a side view depicting a second valve of the trigger sprayer according to the present embodiment.

FIG. 4 is a side view depicting the second valve of the trigger sprayer according to the present embodiment.

As depicted in FIG. 4, the second valve V2 has a second valve piston portion 11*a* slidable along the inner wall 3*a* of the sub-cylinder portion 3 and a dome spring portion 11*b* for pressing the second valve piston portion 11*a* downward.

The dome spring portion 11*b* is in an inverted dome shape coupled to a core rod portion 11*a*3 of the second valve piston portion 11*a*.

The dome spring portion 11*b* is elastically deformable. Thus, at least the dome spring portion 11*b* is manufactured of an elastically deformed material such as resin.

In the second valve V2, the second valve piston portion 11*a* moves upward and downward based on elastic deformation of the dome spring portion 11*b*.

The second valve piston portion 11*a* has the core rod portion 11*a*3, a bell-shaped inner skirt portion 11*a*2 coupled to the core rod portion 11*a*3 and provided on the circumference of the core rod portion 11*a*3, and a bell-shaped outer skirt portion 11*a*1 coupled to the core rod portion 11*a*3 and provided on the circumference of the inner skirt portion 11*a*2. Note that an air gap portion is provided between the core rod portion 11*a*3 and the inner skirt portion 11*a*2 and between the inner skirt portion 11*a*2 and the outer skirt portion 11*a*1. In the air gap portion, the liquid can be accommodated.

Here, a maximum diameter R1 of the outer skirt portion 11*a*1 and a maximum diameter R2 of the inner skirt portion 11*a*2 are equal.

Thus, when the second valve V2 is attached to the sub-cylinder portion 3, both of the outer skirt portion 11*a*1 and the inner skirt portion 11*a*2 simultaneously abut on the inner wall of the sub-cylinder portion 3.

Also, since the diameter of the outer skirt portion 11*a*1 and the diameter of the inner skirt portion 11*a*2 are equal, even if the second valve piston portion 11*a* moves upward and downward, the capacity of the air gap portions surrounded by the outer skirt portion 11*a*1, the inner skirt portion 11*a*2, and the sub-cylinder portion 3 do not change.

With this, it is possible to prevent an occurrence of liquid drippings from the nozzle portion 4 after ejection of the liquid.

In the trigger sprayer 100, as described above, the dome spring portion 11*b* is in an inverted dome shape.

Thus, at the time of elastic deformation described above, a uniform force acts to a circumferential direction of the dome spring portion 11*b*.

With this, in the trigger sprayer 100, the second valve piston portion 11*a* can be uniformly moved upward and downward without imbalances.

As a result, unevenness in the flow rate of the liquid hardly occurs, and ejection stability is more improved.

Also, since the second valve piston portion 11*a* can smoothly move upward and downward, ejection responsiveness is also excellent.

A maximum diameter R3 of the dome spring portion 11*b* is larger than the diameters (R1, R2) of the inner skirt portion and the outer skirt portion of the second valve piston portion 11*a*, preferably 1.5 fold or more.

In this case, since upward and downward movements of the second valve piston portion 11*a* are stabilized and elastic deformation becomes smoother, ejection responsiveness becomes more excellent.

Also, a space in the up-down direction required for expansion and contraction of the second valve V2 can be made as small as possible.

Referring back to FIG. 2, the nozzle portion 4 is, as described above, a portion provided at the front end portion of the third flow path 1*c*, the portion from which the liquid passing through the third flow path 1*c* is ejected.

In the trigger sprayer 100, to the nozzle portion 4, the nozzle cap 40 for protecting the nozzle portion 4 or providing another function is attached. Note that the nozzle cap 40 has a function not particularly limited and can have a function of switching ON/OFF by rotation, a function of foaming or atomizing the liquid, and so forth.

The cover body 50 is attached to cover the base body so as to protect the base body 10.

This at least allows the base body 10 to be prevented from being soiled.

Also, at a position corresponding to a portion above the sub-cylinder portion 3 of the cover body 50, a support wall surface 5 on which the dome spring portion 11*b* abuts is provided.

This causes the dome spring portion 11*b* to extend and contract by taking an upper end abutting on the support wall surface 5 as a base point.

In this manner, in the trigger sprayer 100, by providing the support wall surface 5 by using the cover body 50, it is not required to separately provide the support wall surface 5 to the base body 10. Thus, the length of the base body 10 in the up-down direction can be shortened as much as possible.

In the trigger sprayer 100, the cap 60 is attached to a lower end of the base body 10. This cap 60 can be screwed to a mouth portion of the container B.

With this, in the trigger sprayer 100, the cap 60 is attached to the container B by being screwed to the mouth portion of the container B.

Note that the base body 10 can be freely rotated with respect to the cap 60.

Also, when the cap 60 is attached to the mouth portion of the container B, a flange portion 10*a* formed at a lower end of the base body 10 is pinched between the cap 60 and the mouth portion of the container B, thereby causing the base body 10 to be fixed to the container B.

Figure 5A:
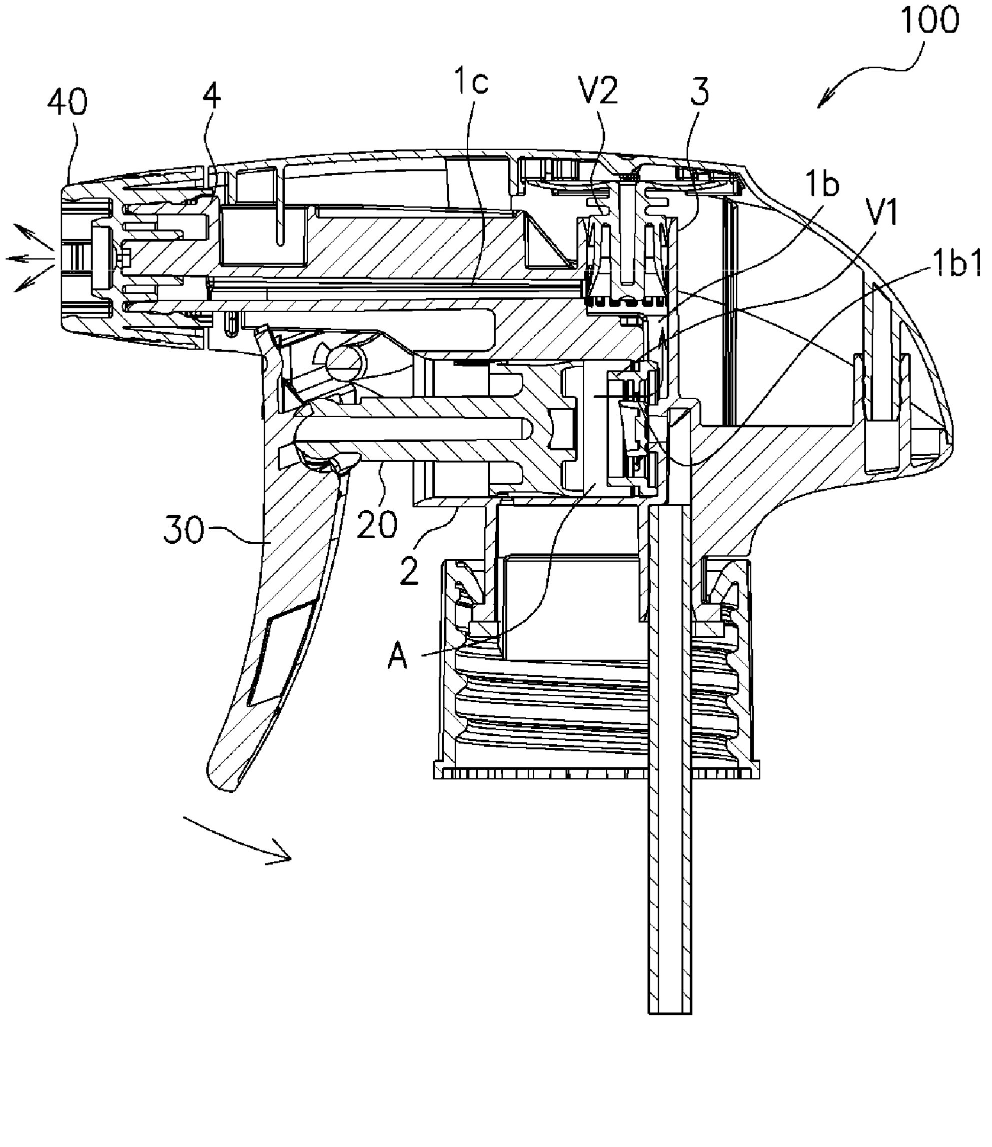
FIG. 5(*a*) is a side sectional view depicting a state in the course of rotating a trigger of the trigger sprayer according to the present embodiment rearward.
Figure 5B:
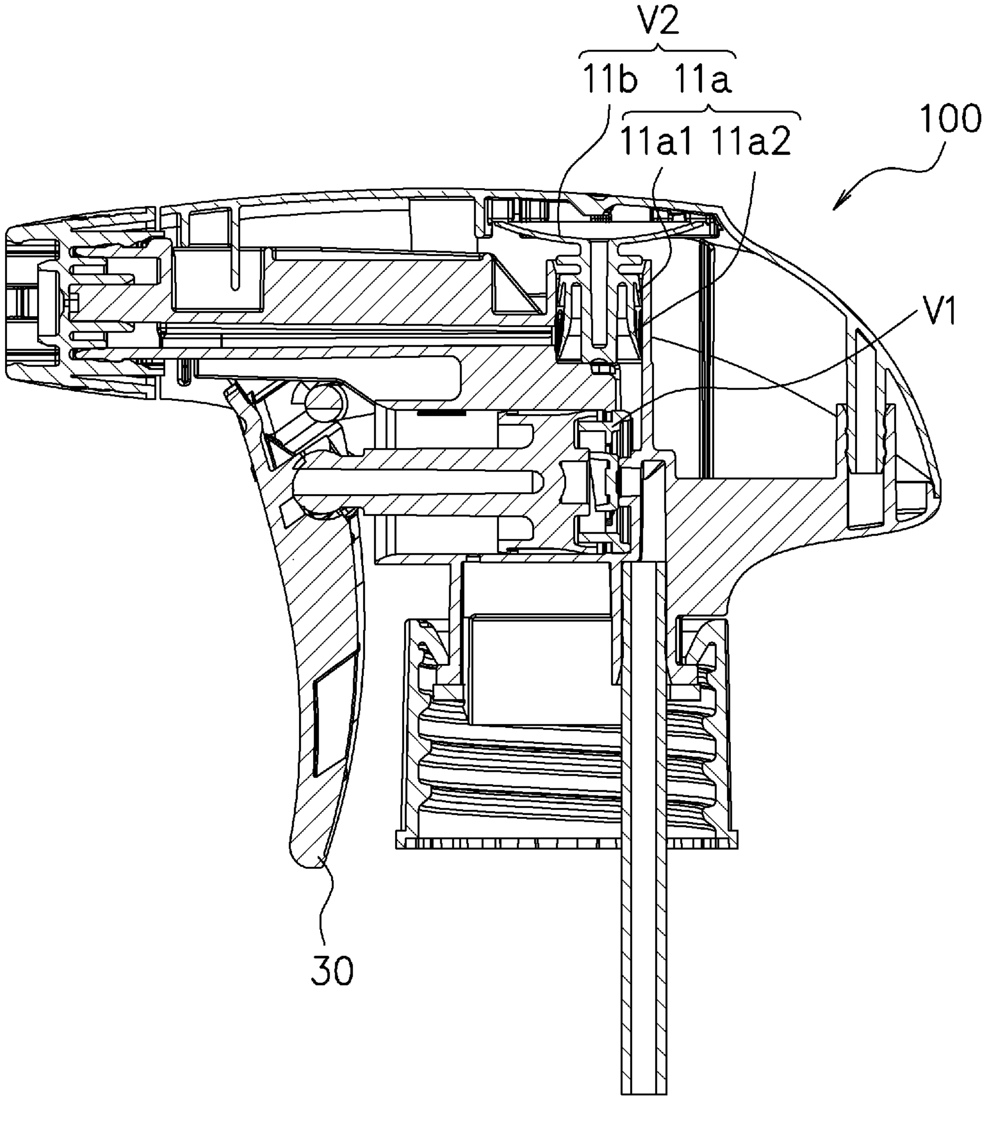
Figure 5C:
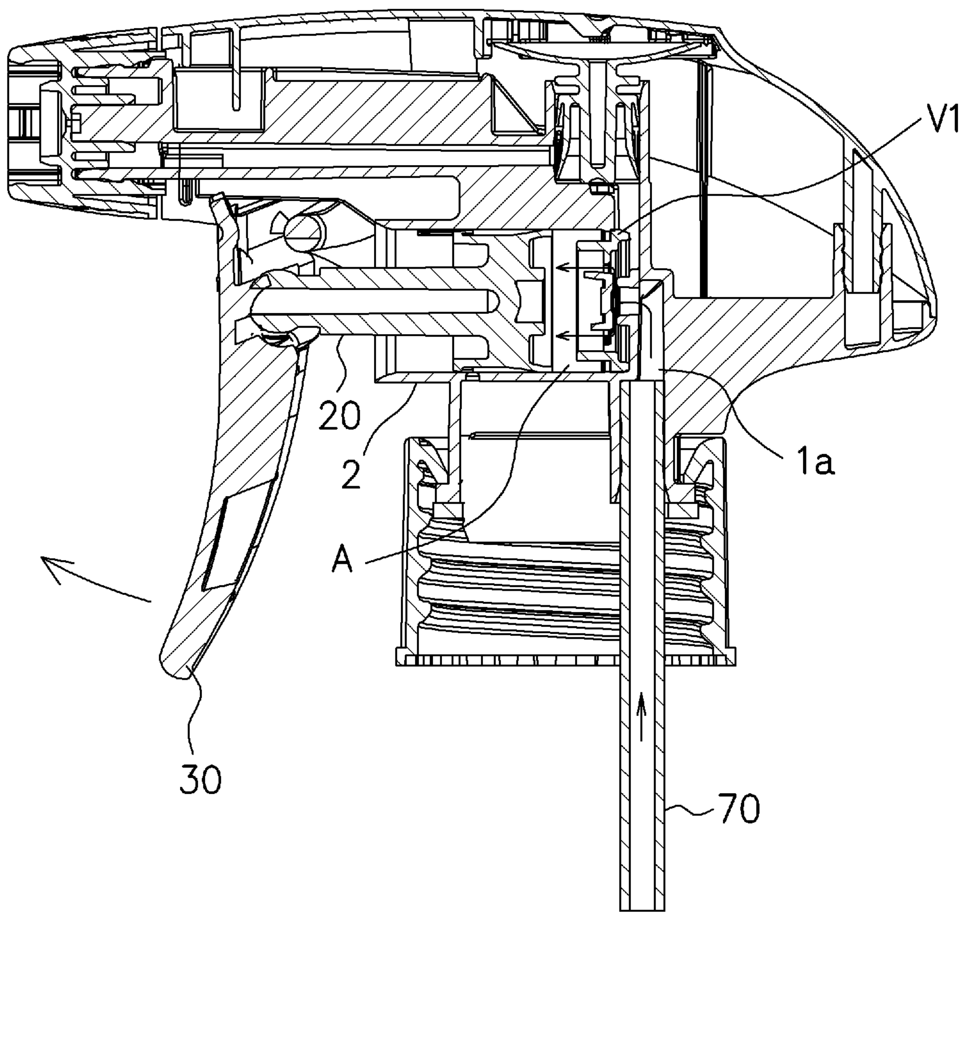

FIG. 5(*a*) is a side sectional view depicting a state in the course of rotating the trigger of the trigger sprayer according to the present embodiment rearward. FIG. 5(*b*) is a side sectional view depicting a state in which, from the state depicted in FIG. 5(*a*), the trigger is completed to be rotated rearward and ejection of liquid is completed. FIG. 5(*c*) is a side sectional view depicting a state, from the state depicted in FIG. 5(*b*), in the course of rotating the trigger forward.

As depicted in FIG. 5(*a*), in the trigger sprayer 100, when the trigger 30 is rotated rearward, the piston portion moves rearward, thereby causing the liquid stored in the inner cylinder space A of the main cylinder portion 2 (or air in an initial state) to become in a state of being pressurized by the piston portion 20.

Note that the first valve V1 is maintained to be in a closed state.

With that, the liquid in the inner cylinder space A (or air in an initial state) flows via the second flow hole 1*b*1 into the second flow path 1*b*.

Then, the liquid (or air in an initial state) flowing into the second flow path 1*b* flows into the sub-cylinder portion 3 to push the second valve V2 up.

Figure 6:
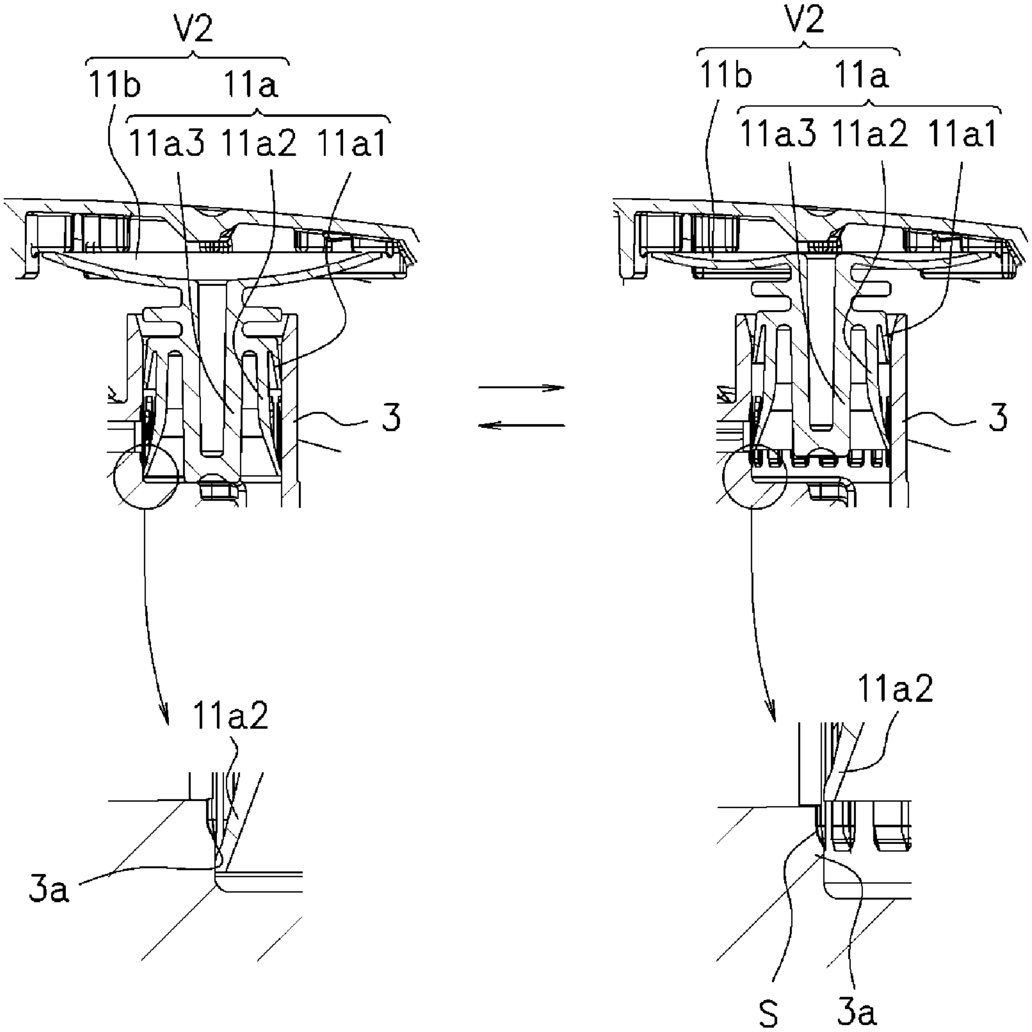
FIG. 6 is a descriptive diagram for describing a state in the trigger sprayer according to the present embodiment in which the second valve is pushed up.

FIG. 6 is a descriptive diagram for describing a state in the trigger sprayer according to the present embodiment in which the second valve is pushed up.

As depicted in FIG. 6, in the second valve V2, with the second valve piston portion 11*a* sliding upward along the inner wall 3*a* of the sub-cylinder portion 3, while the outer skirt portion 11*a*1 maintains a sealed state, a gap S occurs between the inner wall 3*a* of the sub-cylinder portion 3 and the inner skirt portion 11*a*2.

Note that in the trigger sprayer 100 according to the present embodiment, the gap S is formed of the long groove portions 3*b*.

With that, the liquid (or air in an initial state) flows via the gap S through the third flow path 1*c*.

That is, in the trigger sprayer 100, when the second valve V2 closes the flow route of the liquid (in a state on left in FIG. 6), the inside of the sub-cylinder portion 3 is in a state of being sealed by the outer skirt portion 11*a*1 and the inner skirt portion 11*a*2.

Here, the long groove portions 3*b* are provided in an inner wall 3*a* between positions where the outer skirt portion 11*a*1 abuts on the inner wall 3*a* of the sub-cylinder portion 3 and positions where the inner skirt portion 11*a*2 abuts on the inner wall 3*a* of the sub-cylinder portion 3.

And, when the second valve V2 opens the flow route of the liquid (in a state on right in FIG. 6), in the sub-cylinder portion 3, the state of being sealed by the outer skirt portion 11*a*1 is maintained. On the other hand, the inner skirt portion 11*a*2 is in a state of abutting on the inner wall 3*a* between the long groove portions 3*b*.

Here, from the second flow path 1*b*, the liquid is caused to flow from below the inner skirt portion 11*a*2 in the sub-cylinder portion 3 via the long groove portions 3*b* (gap S) and the through hole 3*c* to the third flow path 1*c*.

Also, in addition to this, from the second flow path 1*b*, the flow is caused to pass through the long groove portion 3*b* not provided with through hole 3*c* to flow in between the inner skirt portion 11*a*2 and the outer skirt portion 11*a*1 and, from there, flow via the through hole 3*c* to the third flow path 1*c*.

With this, a sufficient amount of liquid can be caused to flow, and therefore ejection stability is improved.

Also, since the state of being sealed by the sub-cylinder portion 3 and the outer skirt portion 11*a*1 is maintained, the liquid can be prevented from leaking.

Referring back to FIG. 5(*a*), the liquid (or air in an initial state) flowing into the third flow path 1*c* is ejected outside from the nozzle portion 4 via the nozzle cap 40.

Then, when rotation of the trigger 30 is completed and the state in which the inner cylinder space A is pressurized is solved by ejection of the liquid (or air in an initial state), as depicted in FIG. 5(*b*), the second valve V2 presses down the second valve piston portion 11*a* by resilience of the dome spring portion 11*b* to close the flow path.

Here, as described above, since the capacity of the air gap portions surrounded by the outer skirt portion 11*a*1, the inner skirt portion 11*a*2, and the sub-cylinder portion 3 do not change, the liquid can be prevented from dripping from the nozzle portion 4.

On the other hand, as depicted in FIG. 5(*c*), from the state in which the trigger 30 is rotated, when the trigger is released, the trigger 30 is returned to the original position by the spring 80.

Here, since the piston portion 20 moves forward, the inside of the inner cylinder space A of the main cylinder portion 2 becomes at negative pressure.

With that, the liquid is suctioned up from the container by that pressure, and flows via the tube 70 into the first flow path 1*a*.

The liquid flowing into the first flow path 1*a* opens the check valve of the first valve V1, and flows into the inner cylinder space A of the main cylinder portion 2.

Then, when the liquid is stored inside the main cylinder portion 2 and the state in which the inner cylinder space A becomes at negative state by the piston portion 20 is solved, the check valve of the first valve V1 is closed.

In this manner, in the trigger sprayer 100, the operation of the trigger can cause the liquid stored in the base body 10 to be ejected or cause ejection of the liquid to be stopped.

Also, in the trigger sprayer 100, as the second valve V2, one having the second valve piston portion 11*a* and the elastically-deformable, inverted-dome-shaped dome spring portion 11*b* is adopted. Therefore, ejection responsiveness and ejection stability are excellent.

While the preferred embodiment of the present invention has been described above, the present invention is not limited to the above-described embodiment.

In the trigger sprayer 100 according to the present invention, the base body 10 has the piston portion 20, the trigger 30, the first valve V1, the second valve V2, the cover body 50, the nozzle cap 40, the cap 60, and the tube 70 attached thereto as separate bodies, but these may be integrally formed with the base body 10.

Also, the cover body 50, the nozzle cap 40, the cap 60, and the tube 70 are not requisites.

In the trigger sprayer 100 according to the present invention, a check valve is adopted as the first valve V1, but this is not meant to be restrictive.

In the trigger sprayer 100 according to the present invention, the long groove portions 3*b* are provided in the inner wall 3*a* of the sub-cylinder portion 3, but the long-groove portions 3*b* are not requisites.

Also, the shape and number of the long groove portions 3*b*, the position where it is provided, and so forth are not particularly limited.

In the trigger sprayer 100 according to the present invention, the second valve piston portion 11*a* and the dome spring portion 11*b* are integrated, but they may be separable.

INDUSTRIAL APPLICABILITY

The trigger sprayer according to the present invention can be used as a so-called accumulator trigger sprayer that suctions up liquid accommodated in the container, stores a certain amount of the liquid, and continuously ejects it.

According to the trigger sprayer according to the present invention, ejection responsiveness and ejection stability are excellent.

REFERENCE SIGNS LIST

1*a* . . . first flow path
1*a*1 . . . first flow hole
1*b* . . . second flow path
1*b*1 . . . second flow hole
1*c* . . . third flow path
10 . . . base body
100 . . . trigger sprayer
10*a* . . . flange portion
11*a* . . . second valve piston portion

**11*a*1** . . . outer skirt portion
**11*a*2** . . . inner skirt portion
**11*a*3** . . . core rod portion
**11*b*** . . . dome spring portion
12 . . . valve body
2 . . . main cylinder portion
20 . . . piston portion
**2*a*** . . . bottom wall
3 . . . sub-cylinder portion
30 . . . trigger
**3*a*** . . . inner wall
**3*b*** . . . long groove portion
**3*c*** . . . through hole
4 . . . nozzle portion
40 . . . nozzle cap
5 . . . support wall surface
50 . . . cover body
60 . . . cap
70 . . . tube
80 . . . spring
A . . . inner cylinder space
B . . . container
V1 . . . first valve
V2 . . . second valve

The invention claimed is:

1. A trigger sprayer for suctioning up liquid in a container for ejection, the trigger sprayer comprising:

a base body having a first flow path where the liquid flows, a main cylinder portion communicated with the first flow path to be able to store the liquid, a second flow path communicated with the main cylinder portion, a sub-cylinder portion communicated with the second flow path, a third flow path communicated with the sub-cylinder portion, and a nozzle portion provided at a tip of the third flow path;

a piston portion slidable along an inner wall of the main cylinder portion;

a trigger coupled to the piston portion to slide the piston portion;

a first valve which opens and closes between the first flow path and the main cylinder portion and between the main cylinder portion and the second flow path in accordance with pressure inside the main cylinder portion; and a second valve which opens and closes between the second flow path and the sub-cylinder portion and between the sub-cylinder portion and the third flow path in accordance with pressure of the flowing liquid, the second valve having a second valve piston portion that is configured to slide upward and downward along an inner wall of the sub-cylinder portion, and an inverted-dome-shaped dome spring portion for pressing the second valve piston portion, and the dome spring portion being elastically deformable, an inner diameter of the inner wall of the sub-cylinder portion is constant in a direction along which the second valve piston portion slides, and the second valve piston portion has an outer skirt portion abutting on the inner wall of the sub-cylinder portion and an inner skirt portion abutting on the inner wall of the sub-cylinder portion at a portion lower than the outer skirt portion, a diameter of the outer skirt portion and a diameter of the inner skirt portion are equal such that leading edges of the outer skirt portion and the inner skirt portions are always in contact with the inner wall of the sub-cylinder portion while the second valve piston portion slides, and with the second valve piston portion sliding, a gap occurs between the inner wall of the sub-cylinder portion and the inner skirt portion, and the liquid flows via the gap from the second flow path to between the outer skirt portion and the inner skirt portion, and the third flow path;

wherein a diameter of the dome spring portion is larger than a diameter of the second valve piston portion; and a cover body attached to the base body so as to cover at least the second flow path, the sub-cylinder portion, and the third flow path, wherein the cover body is provided with a support wall surface where the dome spring portion abuts.

2. The trigger sprayer according to claim 1, wherein the second valve is arranged above the main cylinder portion.

3. The trigger sprayer according to claim 1, wherein a plurality of groove portions is provided in the inner wall of the sub-cylinder portion, and when the second valve is opened, the liquid flows from the second flow path via the groove portions to the third flow path.

4. The trigger sprayer according to claim 3, wherein each of the groove portions has a vertically elongated shape, and the groove portions are provided so as to be regularly spaced in a circumferential direction.

* * * * *